(12) United States Patent
Tsuda

(10) Patent No.: US 7,042,819 B2
(45) Date of Patent: May 9, 2006

(54) OPTICAL PICKUP APPARATUS

(75) Inventor: Yoichi Tsuda, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 670 days.

(21) Appl. No.: 10/186,931

(22) Filed: Jun. 28, 2002

(65) Prior Publication Data

US 2003/0016598 A1    Jan. 23, 2003

(30) Foreign Application Priority Data

Jun. 29, 2001    (JP) ............................ P2001-199470

(51) Int. Cl.
*G11B 7/00*    (2006.01)
(52) U.S. Cl. ............................... 369/44.41; 369/44.24; 369/44.12; 369/44.32; 369/112.01
(58) Field of Classification Search ........................ None
See application file for complete search history.

(56) References Cited

U.S. PATENT DOCUMENTS

| | | | |
|---|---|---|---|
| 5,475,670 A | 12/1995 | Hamada et al. | |
| 6,072,579 A | 6/2000 | Funato | |
| 6,614,825 B1 * | 9/2003 | Hang et al. | 369/44.37 |
| 6,618,344 B1 | 9/2003 | Funato | |
| 6,654,320 B1 * | 11/2003 | Fukakusa et al. | 369/44.14 |

FOREIGN PATENT DOCUMENTS

| | | |
|---|---|---|
| EP | 1 069 555 | 1/2001 |
| JP | 1-258238 | 10/1989 |
| JP | 5-020691 | 1/1993 |
| JP | 5-020711 | 1/1993 |
| JP | 5-040958 | 2/1993 |
| JP | 5-067919 | 9/1993 |
| JP | 6-036338 | 2/1994 |
| JP | 8-293127 | 11/1996 |
| JP | 9-204662 | 8/1997 |
| JP | 2000-076688 | 3/2000 |
| JP | 2001-028146 | 1/2001 |
| JP | 2001-110085 | 4/2001 |

* cited by examiner

*Primary Examiner*—Muhammad Edun
(74) *Attorney, Agent, or Firm*—Morrison & Foerster LLP

(57) ABSTRACT

An object of the present invention is to provide an optical pickup apparatus which changes characteristics of a light-emitting device or hologram to reduce problems of track servo deviation due to scratches on a surface of an optical disc. By aligning a photoreceptive domain for focusing error signal (PDf) and a photoreceptive domain for tracking error signal (PDt), even in a case where scattering light made by a scratch in the tangent direction of a track of an optical disc reaches the photoreceptive domains, light diffracted in a HA+B domain of a hologram pattern does not enter into photoreceptive portion F or G of the PDt. Therefore, scattering of light which enters the PDf does not influence a tracking error signal (TES), so that the TES does not become abnormally large, and track servo deviation can be prevented.

9 Claims, 13 Drawing Sheets

RELATION BETWEEN GRATING GROOVE DEPTH AND SPECTRAL RATIO

OPTICAL PICKUP APPARATUS

BACKGROUND OF THE INVENTION

1. Field of the Invention

The present invention relates to an optical pickup apparatus of an optical disc apparatus which is installed in a personal computer and the like and which records or reproduces data by the use of light.

2. Description of the Related Art

An optical pickup apparatus of an optical disc apparatus irradiates an optical disc with a light beam, receives reflected light to read a signal, performs feedback control so as to minimize servo error signals read from a track on the optical disc, and makes the light beam follow the track on the optical disc.

Servo error signals include two types of error signals, one of which is of focusing error signal (abbreviated as FES from now on) and the other of which is of tracking error signal (abbreviated as TES from now on). An FES is a signal which indicates a deviation in a focusing direction with respect to an optical disc, and maintains predetermined conditions with respect to a space between an object lens and a data recording face of the optical disc and a relative position between the object lens and a pit line of the data recording face into given conditions. On the other hand, a TES is a signal which corresponds to a deviation of light collected on an optical disc from the center of a track, and based on this signal, a light beam is made to correctly follow the track.

In cases where there is a scratch on an optical disc, a servo error signal becomes too large owing to the scratch and a servo often deviates from a track followed at present, with the result that such a problem occurs that data becomes incomplete while a CD-R (compact disc-recordable) is read out.

Further, as a conventional optical pickup apparatus is disclosed "a light-receiving/emitting integral device and an optical pickup using the same" in Japanese Unexamined Patent Publication JP-A 2001-110085 (2001). In the light-receiving/emitting integral device and optical pickup using the same disclosed in the publication, a lightproof mask is provided for the purpose of preventing random light that a light beam emitted from a semiconductor laser device is reflected on a surface of an object lens toward an optical detector, and provision of the lightproof mask makes it possible to detect a stable signal.

Characteristics of light in cases where there is a scratch on a surface of an optical disc will be explained referring to FIG. 14. FIG. 14 is a view showing a condition where scattering light is caused in a direction orthogonal to a scratch 94 on a surface of an optical disc 8. As shown in FIG. 14, in cases where the scratch 94 exists on the surface of the optical disc 8, a light beam from a semiconductor laser diode is scattered by the scratch 94. On a linear scratch, light is easy to scatter in a direction orthogonal to the direction of the scratch, whereas hard to scatter in a direction parallel to the scratch, so that a radiation pattern of scattering light caused on a linear scratch has a nearly oval shape which is longer in a direction orthogonal to the direction of the scratch.

Of the scratches 94 on the surface of the optical disc 8, a scratch in the tangent direction of a track is easy to cause track servo deviation due to influences of the scratch because a time to pass the scratch becomes long as compared with a time to pass a scratch in the radial direction orthogonal to the track.

A method of detecting a TES necessary for a track servo in an optical pickup apparatus will be explained. A light beam from a semiconductor laser diode is divided into three beams by a grating, and one main beam and two sub beams are emitted to a track on an optical disc in nearly parallel while low angles are formed. That is to say, the beams are emitted in a manner that the sub beams are displaced by a half of a track pitch with respect to the main beam. FIG. 10 is a view showing a state where a main beam (M) and sub beams (S1, S2) are collected on an optical disc in an optical pickup apparatus.

FIG. 15 is a view showing a light-emitting device and an entering pattern of scattering light caused by a scratch of an optical disc in the prior art. As shown in FIG. 15, three divided beams are diffracted at a hologram pattern 4 which is divided into three domains HA+B, HC and HD, respectively, and divided into nine beams. The nine beams are entered into a photoreceptive domain for focusing error signal (hereinafter abbreviated as PDf) and a photoreceptive domain for tracking error signal (hereinafter abbreviated as PDt). The PDf is divided into two photoreceptive portions A, B, and the PDt is divided into six photoreceptive portions C, D, E, F, G, H. A main beam from the HA+B domain of the hologram pattern 4 enters the center of the photoreceptive portions A, B of the PDf, three beams from the HC domain enter into the photoreceptive portions E, C, G of the PDt, and three beams from the HD domain enter into the photoreceptive portions F, D, H of the PDt. When signals from the respective photoreceptive portions A to H are denoted by A to H, a TES can be found by an equation below:

$$TES = C - D - \{(E+G) - (F+H)\} \quad (1)$$

Here, the relation between the signals A to H and reflection signals of three points collected onto the optical disc becomes a relation shown in FIG. 10. Such a detection system of detecting imbalance of distribution of reflected light caused by displacement between a track and a light beam by using an optical detector to obtain a TES as described above is called differential push-pull, and this system is suitable for a recordable type (CD-R) and a rewritable type (CD-RW).

In cases where there is a scratch on the optical disc, M, S1, S2 are scattering light and therefore cannot be focused in a dot state onto the photoreceptive portions of the PDf and the PDt, so that such a radiation pattern of scattering light as shown in FIG. 15 is projected on the photoreceptive portions of the PDf and the PDt.

Of scattering light, M is set to have a large amount of light as compared with S1, S2 (in general, S1:M:S2=1:10:1), with the result that scattering light from M becomes a leading cause of making a TES abnormally large.

Scattering light 93 from M enters almost the center of the photoreceptive portions A, B of the PDf and the photoreceptive portions C, D of the PDt, scattering light from S1 enters the photoreceptive portions E, G of the PDt, and scattering light from S2 enters the photoreceptive portions F, H of the PDt. That is to say, the layout of the three beams on the optical disc is projected onto the photoreceptive portions E, C, G and F, D, H of the PDt as it is.

Further, in cases where there is a scratch in the tangent direction of the track on the optical disc, scattering light due to the scratch shows a radiation characteristic of expanding in a direction orthogonal to the direction of the scratch, that is, the radial direction of the track and a direction orthogonal to an alignment of the three beams.

Therefore, the scattering light 93 from M due to the scratch in the tangent direction of the track is projected as a pattern of expanding in a direction orthogonal to an alignment direction of the photoreceptive portions E, C, G or F, D, H on the PDt.

At this moment, scattering light of the three beams enters the photoreceptive portions A, B of the PDf and the photoreceptive portions C, D of the PDt. In cases where the scattering light 93 from M having a large light amount of the three beams enters the photoreceptive portion G or F of the PDt, a signal of G or F shows an abnormally large value in a TES of the equation (1). Therefore, a TES becomes abnormally large and a servo deviates from a followed track. In this specification, "a servo deviates from a followed track" may be expressed as "a track servo deviates."

SUMMARY OF THE INVENTION

An object of the invention is to provide an optical pickup apparatus which changes a characteristic of a light-emitting device or hologram to reduce track servo deviation due to a scratch on a surface of an optical disc.

The invention provides an optical pickup apparatus comprising a light-emitting device having a photoreceptive domain for focusing error signal and a photoreceptive domain for tracking error signal formed independently, the optical pickup apparatus outputting a focusing error signal necessary for a focus servo process in response to light received in the photoreceptive domain for focusing error signal, and outputting a tracking error signal necessary for a track servo process in response to light received in the photoreceptive domain for tracking error signal, the optical pickup apparatus being constituted so as to reduce influences of scattering of light entering the photoreceptive domain for focusing error signal, on the tracking error signal.

The invention provides an optical pickup apparatus, comprising:

a light source;

a light-emitting device which has a photoreceptive domain for focusing error signal and a photoreceptive domain for tracking error signal formed independently;

a stem on which the light source and the light-emitting device are mounted;

a cap fixed to the stem, for sealing the light source and the light-emitting device; and a hologram device fixed to the cap, the optical pickup apparatus being constituted so as to output a focusing error signal necessary for a focus servo process in response to light received in the photoreceptive domain for focusing error signal, output a tracking error signal necessary for a track servo process in response to light received in the photoreceptive domain for tracking error signal, and reduce influences of scattering of light entering the photoreceptive domain for focusing error signal, on a tracking error signal.

According to the invention, by preventing scattering light in the photoreceptive domain for focusing error signal from entering the photoreceptive domain for tracking error signal, or, even in cases where the scattering light enters, by limiting a signal from a photoreceptive portion of the photoreceptive domain for tracking error signal where the scattering light enters to a low level, it is possible to prevent a tracking error signal from becoming abnormally large owing to scattering light caused by a scratch made in the tangent direction of a track of an optical disc and prevent a track servo from deviating.

Further, in the invention it is preferable that the photoreceptive domain for tracking error signal is divided into a plurality of photoreceptive portions; and the plurality of photoreceptive domains for tracking error signal and the photoreceptive domain for focusing error signal are aligned in one line.

According to the invention, by entering light into the plurality of photoreceptive domains for tracking error signal and the photoreceptive domain for focusing error signal aligned in one line, scattering of light entering the photoreceptive domain for focusing error signal is prevented from entering the photoreceptive domains for tracking error signal, with the result that it is possible to prevent track servo deviation, which is caused when a tracking error signal becomes abnormally large.

Still further, in the invention it is preferable that the photoreceptive domain for tracking error signal is divided into a plurality of photoreceptive portions; and of the divided photoreceptive portions, on an entire face of a photoreceptive portion close to the photoreceptive domain for focusing error signal or on part of a side close to the photoreceptive domain for focusing error signal, lightproof means is mounted.

According to the invention, by mounting the lightproof means on the entire face of a photoreceptive portion close to the photoreceptive domain for focusing error signal or on part of a side close to the photoreceptive domain for focusing error signal of the divided photoreceptive portions of the photoreceptive domain for tracking error signal, it is possible to reduce influences of scattering light on a tracking error signal, and it is possible to prevent a track servo from deviating.

Still further, in the invention it is preferable that the photoreceptive domain for tracking error signal is divided into a plurality of photoreceptive portions; and of the divided photoreceptive portions, an area of a photoreceptive portion close to the photoreceptive domain for focusing error signal is smaller than areas of the other photoreceptive portions.

According to the invention, by setting the area of a photoreceptive portion close to the photoreceptive domain for focusing error signal to be smaller than the areas of the other photoreceptive portions, the entering area, that is, the amount of entering light is decreased even in a case where scattering due to a scratch is large, so that it is possible to reduce influences on a tracking error signal, and it is possible to prevent a track servo from deviating.

Still further, in the invention it is preferable that the photoreceptive domain for tracking error signal is divided into a plurality of photoreceptive portions; and of the divided photoreceptive portions, a photoreceptive portion close to the photoreceptive domain for focusing error signal has smaller sensitivity than the other divided photoreceptive portions.

According to the invention, sensitivity of a photoreceptive portion close to the photoreceptive domain for focusing error signal of the divided photoreceptive portions of the photoreceptive domain for tracking error signal is set to be smaller than that of the other divided photoreceptive portions, whereby a signal outputted from this portion becomes small even in cases where scattering light enters, and influences of the scattering light on a tracking error signal are reduced. Therefore, it is possible to prevent a track servo from deviating.

Still further, in the invention it is preferable that the photoreceptive domain for tracking error signal is divided into a plurality of photoreceptive portions; and of the divided photoreceptive portions, a photoreceptive portion close to the photoreceptive domain for focusing error signal has larger surface reflectance than the other divided photoreceptive portions.

According to the invention, surface reflectance of a photoreceptive portion close to the photoreceptive domain for focusing error signal of the divided photoreceptive portions of the photoreceptive domain for tracking error signal is set to be larger than that of the other divided photoreceptive portions, whereby scattering light is reflected even in the case of entering the photoreceptive portion with larger surface reflectance, and influences of the scattering light on a tracking error signal are reduced. Therefore, it is possible to prevent a track servo from deviating.

Still further, in the invention it is preferable that the photoreceptive domain for tracking error signal is divided into a plurality of photoreceptive portions;

light entering a light-emitting device is divided into one main beam and two sub beams; and the main beam enters the photoreceptive domain for focusing error signal and a ratio of a light amount of the main beam to those of the sub beams is lowered, whereby a light amount of scattering light of the main beam entering a photoreceptive portion of the photoreceptive domain for tracking error signal close to the photoreceptive domain for focusing error signal is reduced.

According to the invention, by lowering the ratio of the light amount of the main beam to those of the sub beams, it is possible to reduce that scattering light of the main beam entering the photoreceptive domain for focusing error signal enters a photoreceptive domain for tracking error signal close to the photoreceptive domain for focusing error signal, and influences of the scattering light on a tracking error signal are reduced. Therefore, it is possible to prevent a track servo from deviating.

Still further, in the invention it is preferable that an amount of light entering the photoreceptive domain for focusing error signal is set to be smaller than an amount of light which enters the photoreceptive domain for tracking error signal.

According to the invention, the amount of light which enters the photoreceptive domain for focusing error signal is set to be smaller than the amount of light which enters the photoreceptive domain for tracking error signal, whereby influences on an output electric signal of the photoreceptive portion of the photoreceptive domain for tracking error signal become relatively small, and influences of scattering light on a tracking error signal are reduced. Therefore, it is possible to prevent a track servo from deviating.

Still further, in the invention it is preferable that an entering position into the photoreceptive domain for focusing error signal is separated from the photoreceptive domain for tracking error signal so that scattering of light which enters the photoreceptive domain for focusing error signal does not enter into the photoreceptive domain for tracking error signal.

According to the invention, an entering position into the photoreceptive domain for focusing error signal is separated from the photoreceptive domain for tracking error signal, whereby the ratio of the light amount that scattering light of light entering the photoreceptive domain for focusing error signal enters the photoreceptive domain for tracking error signal is lowered. Therefore, influences on a tracking error signal are reduced, and it is possible to prevent a track servo from deviating.

According to the invention, occurrence of track servo deviation due to a scratch of an optical disc, especially a scratch made in the tangent direction of a track, is reduced, and it is possible to constitute an optical pickup apparatus which is hard to cause a problem of reading an optical disc having a scratch and writing in the disc.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
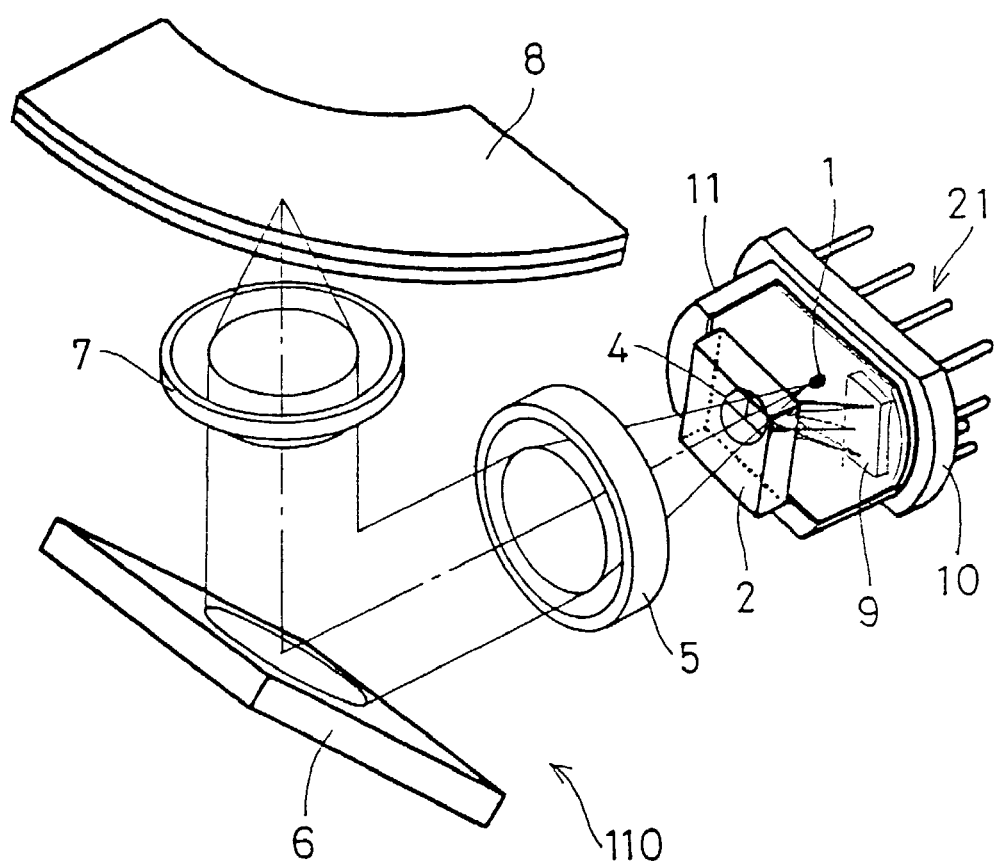
FIG. 1 is a view showing a pickup section having an optical pickup apparatus which is a first embodiment of the present invention.

Now referring to the drawings, preferred embodiments of the invention are described below.

FIG. 1 is a view showing a pickup section 110 having an optical pickup apparatus 21 which is a first embodiment of the present invention. The pickup section 110 comprises an optical pickup apparatus 21, a collimate lens 5, a mirror 6, and an object lens 7. The optical pickup apparatus 21 comprises a semiconductor laser diode 1, a hologram device 2, a light-emitting device 9, a stem 10, and a cap 11. In the hologram device 2, a hologram pattern 4 is formed. The semiconductor laser diode 1 and the light-emitting device 9 are mounted on the stem 10, and sealed by the cap 11.

The semiconductor laser diode 1 is a light source in the optical pickup apparatus 21. The hologram device 2 is a device in which the hologram pattern 4 and a grating are formed. The hologram device 2 has a function of dividing a light beam into three by the grating and diffracting light to an optical disc and light from the optical disc by the hologram pattern 4. The collimate lens 5 changes entering light to parallel light. The mirror 6 is a mirror which reflects light from the collimate lens 5 and guides the light to the object lens 7. The object lens 7 is a lens for collecting entering light to a data recording face of an optical disc 8. The light-emitting device 9 comprises a plurality of photoreceptive domains for detecting a focusing error signal (FES) and a tracking error signal (TES), and is used for detection of a FES and a TES.

Figure 2A:
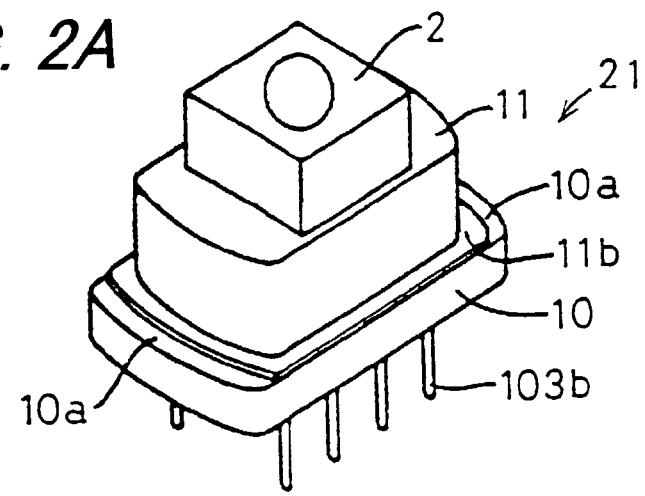
FIGS. 2A, 2B are a perspective view and an exploded perspective view of the optical pickup apparatus.
Figure 2B:
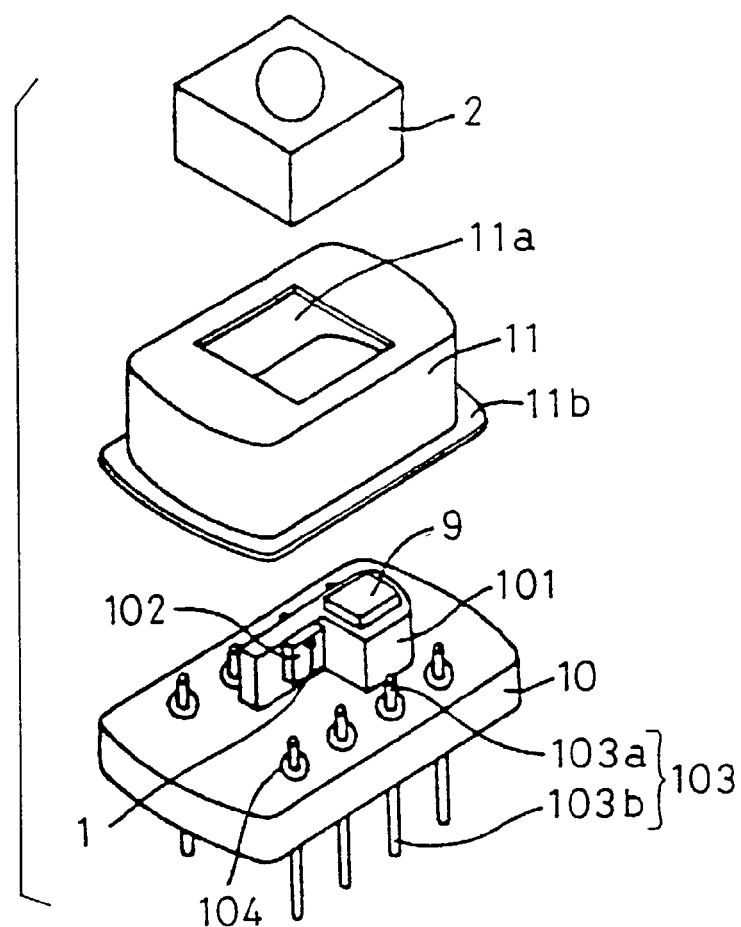

FIGS. 2A and 2B are a perspective view and an exploded perspective view of the optical pickup apparatus 21. As shown in FIG. 2A, the semiconductor laser diode 1, the hologram device 2 and the light-emitting device 9 of FIG. 1 constitute the optical pickup apparatus 21 formed into one body. Further, as shown in FIG. 2B, in the optical pickup apparatus 21, a chip die bond block section 101 and an eyelet section 104 are mounted on the stem 10, and a lead pin 103 is provided on a back face thereof. On the chip die bond block section 101, a sub mount device 102 which covers the semiconductor laser diode 1 and the light-emitting device 9 are mounted. The optical pickup apparatus 21 has a structure that the cap 11 made of metal is fixed to the stem 10 and the hologram device 2 is fixed to the cap 11. On the other hand, there is an optical pickup apparatus constituted without the sub mount device 102.

In FIG. 1, a radial light beam emitted from the semiconductor laser diode 1 which is a light source is passed through the hologram device 2 and made to be parallel light by the collimate lens 5, and after a light path thereof is bent by the mirror 6, the light beam is collected onto the optical disc 8 by the object lens 7. The light beam reflected on the data recording face of the optical disc 8 is made to be parallel light again by the object lens 7, and after a light path thereof is bent by the mirror 6, the light beam is passed through the collimate lens 5 and the hologram device 2, and collected to the semiconductor laser diode 1. At this moment, by the hologram pattern 4 having a function as a diffraction grating formed on a surface of the hologram device 2, a direction of part of the light beam is bent owing to a diffraction phenomenon, and the light beam enters the light-emitting device 9 placed ahead in a direction of the bend.

Figure 3:
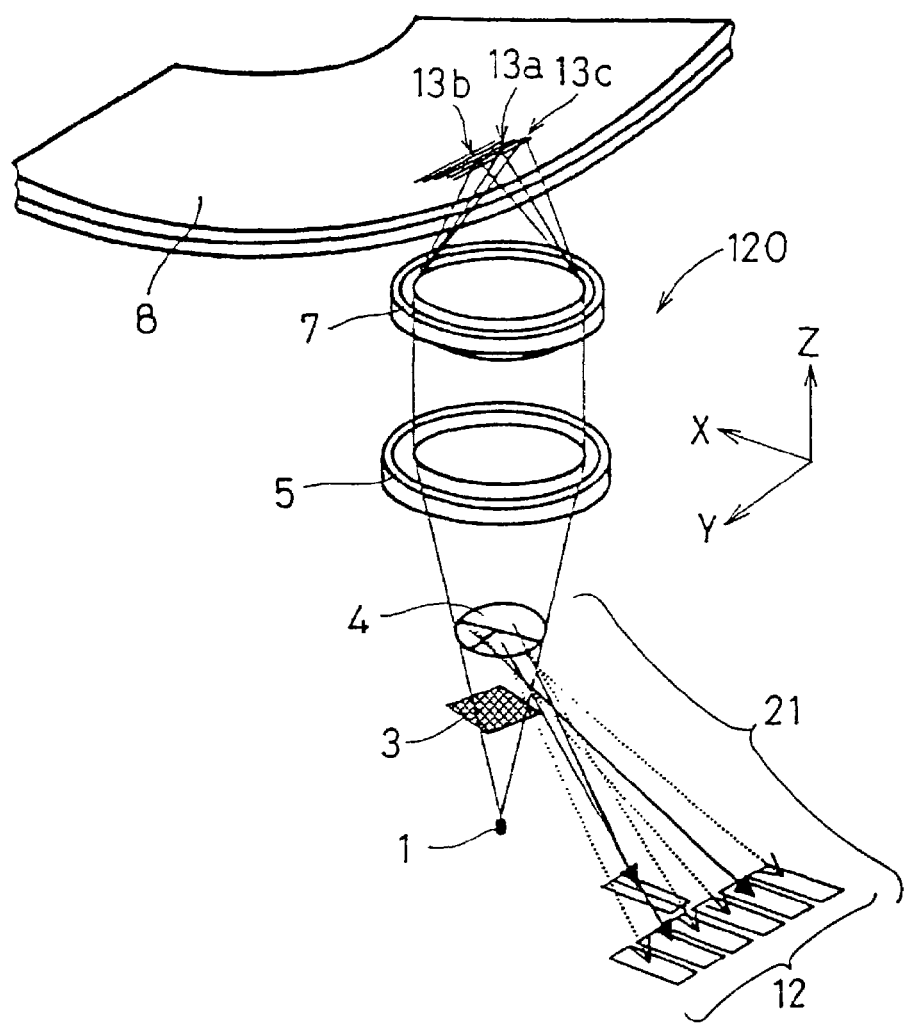
FIG. 3 is a light path view in a pickup section using the optical pickup apparatus.

A light path of a pickup section 120 will be explained by the use of FIG. 3. FIG. 3 is a light path view in the pickup section 120 using the optical pickup apparatus 21. As shown in FIG. 3, the pickup section 120 is constituted in a manner that the mirror 6 is omitted from the constitution view of the pickup section 110 of FIG. 1. A light beam emitted from the semiconductor laser diode 1 is divided by a grating 3 formed on a surface close to the semiconductor laser diode 1 of the hologram device 2, into three directions of zero-order diffraction light which is a main beam, first-order diffraction light and minus-first-order diffraction light which are sub beams. A light amount ratio among the zero-order diffraction light, the first-order diffraction light or the minus-first-order diffraction light divided into three directions is set to be first-order:zero-order:minus-first-order=1:10:1. A light beam which enters the collimate lens 5 of the three beams passed through the hologram pattern 4 is made to be parallel, guided to the object lens 7, and collected to spots 13a, 13b and 13c on the optical disc 8 as the zero-order diffraction light, the first-order diffraction light and the minus-first-order diffraction light, respectively.

Light beams from the three spots 13a, 13b and 13c reflected on the data recording face of the optical disc 8 are passed through the object lens 7 and the collimate lens 5, and a direction of part thereof is bent because of diffraction at the hologram pattern 4 having such a pattern that a circle is divided into one half-circle and two quarter-circles. The bent light beams are collected to a plurality of photoreceptive domains 12 formed on a surface of the light-emitting device 9, respectively. On the basis of the lights collected to the photoreceptive domains 12, a FES and a TES are detected.

A FES is used for a focus servo process, and a TES is used for a track servo process. In other words, a FES is outputted in accordance with deviation in a focus direction (Z axis direction of FIG. 3) of the object lens 7 due to face fluctuations of the optical disc 8 and so on, and the object lens 7 is moved in the focus direction so that a FES becomes zero at all times, that is, so that a distance between the object lens 7 and the optical disc 8 is kept to be constant. By thus performing feedback control, the object lens 7 follows face fluctuations of the optical disc 8, and keeps a focus state at all times.

A TES is outputted in accordance with deviation of a beam spot from a track in a direction perpendicular to a tangent of the track of the optical disc 8, that is, in the Y axis direction of FIG. 3, and the pickup section 120 is moved in the Y axis direction so that a TES becomes zero at all times. By thus performing feedback control, even in a case where the optical disc 8 is decentered, it is possible to follow decentering and control so that the beam spot traces on the track at all times.

Figure 4:
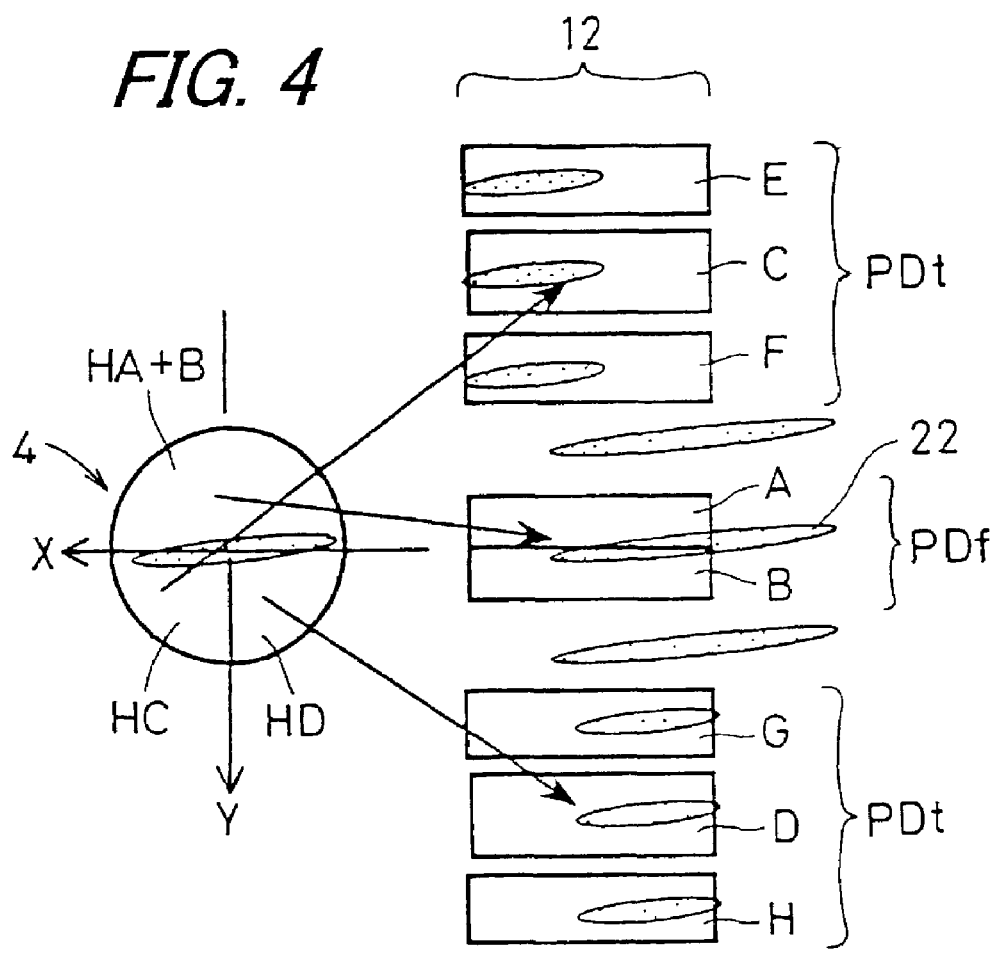
FIG. 4 is a view showing a light-emitting device and an entering pattern of scattering light due to a scratch of an optical disc in the first embodiment of the invention.

FIG. 4 is a view showing the light-emitting device and an entering pattern of scattering light due to a scratch of the optical disc in the first embodiment of the invention. As shown in FIG. 4, as a plurality of photoreceptive domains 12 formed on the surface of the light-emitting device 9, a photoreceptive domain for FES (abbreviated as PDf from now on) and photoreceptive domains for TES (abbreviated as PDt from now on) are independently formed, and placed so that the PDt sandwiches the PDf and the PDf and the PDt align in one line in the Y axis direction of the hologram pattern 4. The PDf is constituted by two photoreceptive portions A, B for FES into which light diffracted in a HA+B domain of the hologram pattern 4 enters. The PDt is constituted by six photoreceptive portions C, D, E, F, G, H for TES which light diffracted in HC and HD domains of the hologram pattern 4 enters. In order to correctly enter light diffracted in the respective domains of the hologram pattern 4 into the photoreceptive portions of the PDf and the PDt aligned in one line, in the embodiment, a diffraction angle is adjusted by changing a diffraction grating pitch and an angle of the hologram pattern 4.

By thus placing the PDf and the PDt so as to align in one line, even in a case where scattering light which is made by a scratch in the tangent direction of the track of the optical disc and expanded in a direction parallel to the X axis reaches the photoreceptive domains, light 22 diffracted in the HA+B domain of the hologram pattern 4 is prevented from entering the photoreceptive portion F or G of the PDt.

Therefore, scattering light of light which enters the PDf does not influence a TES, so that a TES does not become abnormally large, and it is possible to prevent a following track servo from deviating.

Figure 5A:
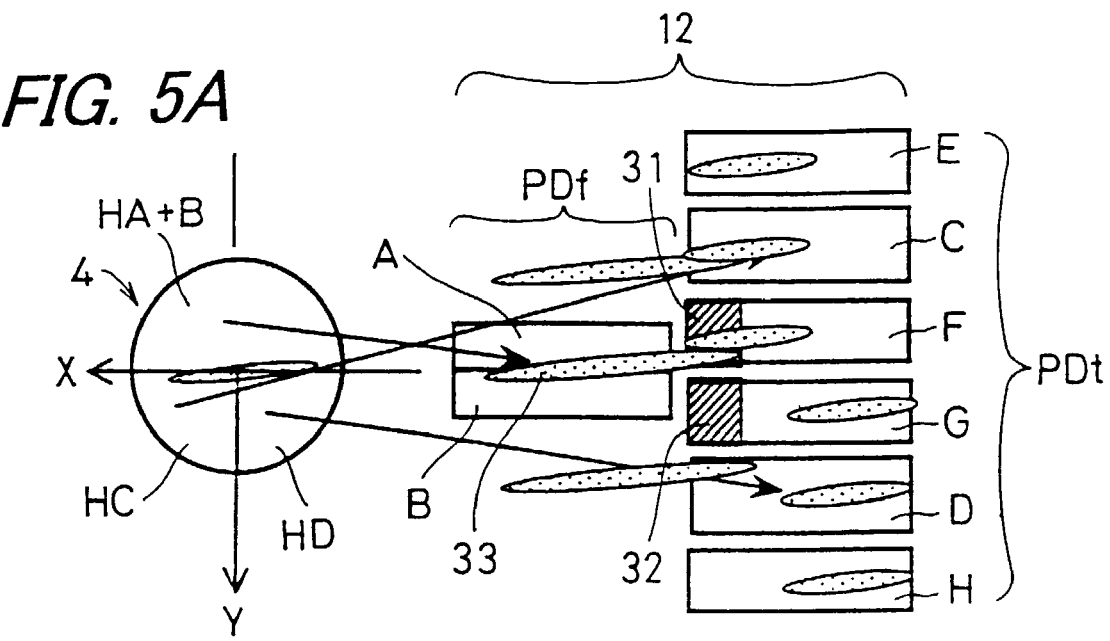
FIGS. 5A, 5B are views showing a light-emitting device and an entering pattern of scattering light due to a scratch of an optical disc in a second embodiment of the invention.
Figure 5B:
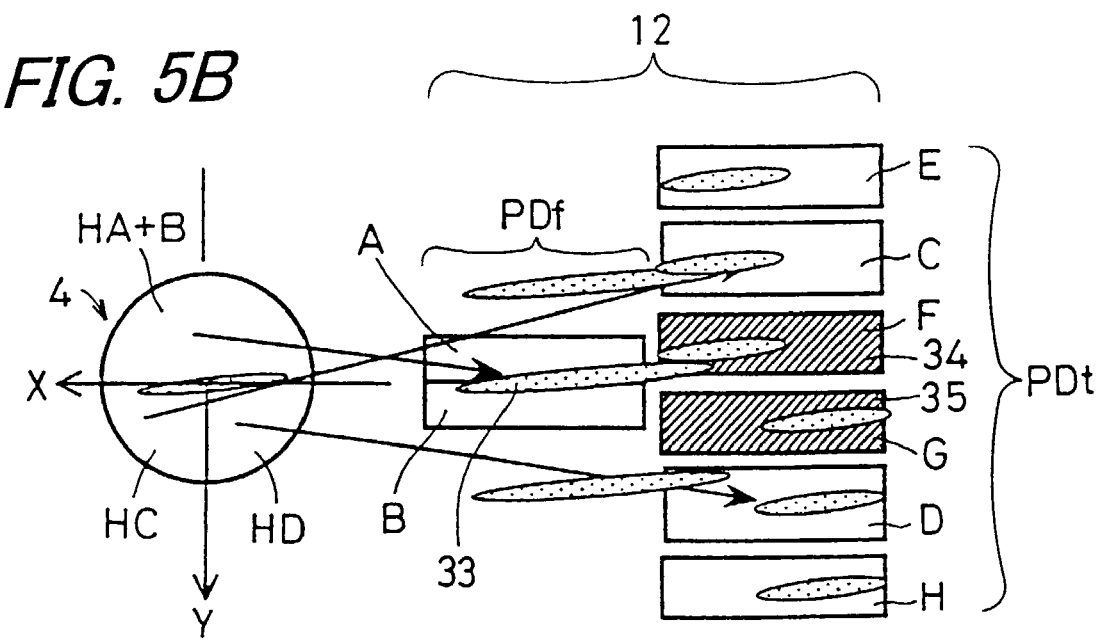

FIGS. 5A, 5B are views showing a light-emitting device and an entering pattern of scattering light due to a scratch of an optical disc in a second embodiment of the invention. As shown in FIGS. 5A, 5B, as the plurality of photoreceptive domains 12 formed on the surface of the light-emitting device 9, the PDf and the PDt are independently formed, and apart from a line of the PDt having a plurality of photoreceptive portions, the photoreceptive portions A, B of the PDf are placed so as to be adjacent to the photoreceptive portions F, G of the PDt.

In the embodiment, as shown in FIG. 5A, lightproof films 31, 32 which block out light entering from the surface are formed by Au evaporation on part of the photoreceptive portions F, G of the PDt close to the PDf, or as shown in FIG. 5B, lightproof films 34, 35 are formed on the entire faces of the photoreceptive portions F, G of the PDt close to the PDf. The lightproof films 31, 32 has a length of 25 µm corresponding to 10% of 250 µm which is a length in the longitudinal direction of the photoreceptive portions E, G of the PDt, and are lightproof means formed on the photoreceptive portions F, G of the PDt close to the PDf.

Further, in order to prevent malfunction caused when light enters a part other than the photoreceptive domains 12 on the surface of the light-emitting device 9, the lightproof films 31, 32 or 34, 35 are formed in such a manner that the shape of a patterning mask in a process of forming an Au lightproof film is changed and an Au lightproof film is evaporated in a state where resists with which the photoreceptive portions F, G are covered in order that an Au lightproof film does not adhere thereto are removed therefrom.

By thus forming the lightproof films 31, 32 or 34, 35 onto the photoreceptive portions F, G of the PDt, even in a case where scattering light which is made by a scratch in the tangent direction of the track of the optical disc and expanded in a direction parallel to the X axis reaches the photoreceptive domains, light 33 diffracted in the HA+B domain of the hologram pattern 4 is prevented from being converted as an output electric signal of the photoreceptive portion F or G of the PDt. Therefore, influences on a TES by scattering light of light which enters the PDf are reduced, so that a TES does not become abnormally large, and it is possible to prevent a following track servo from deviating.

Figure 6:
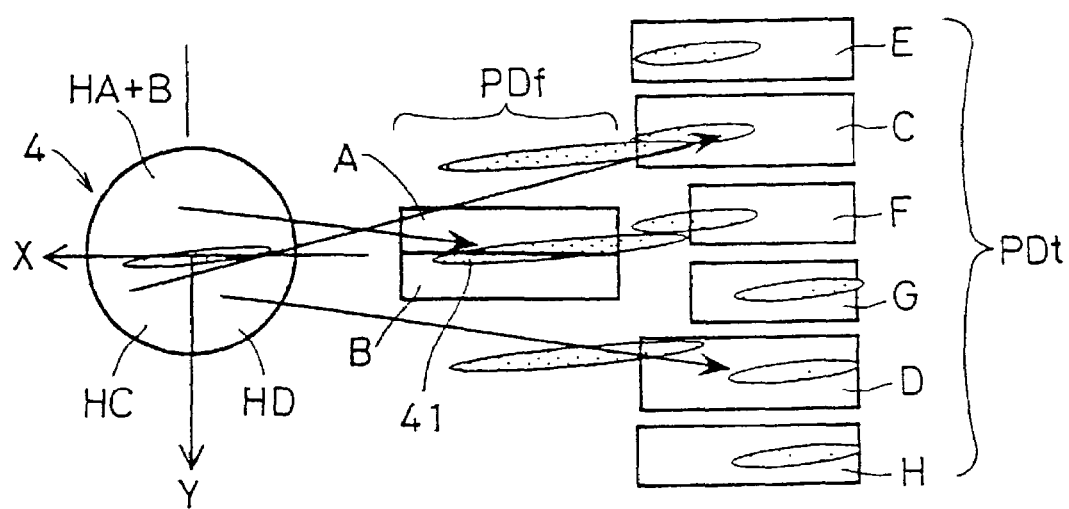
FIG. 6 is a view showing a light-emitting device and an entering pattern of scattering light due to a scratch of an optical disc in a third embodiment of the invention.

FIG. 6 is a view showing a light-emitting device and an entering pattern of scattering light due to a scratch of an optical disc in a third embodiment of the invention. As shown in FIG. 6, the PDf and the PDt are independently formed as in the second embodiment, and other than a line of the PDt, the photoreceptive portions A, B of the PDf are placed so as to be adjacent to the photoreceptive portions F, G of the PDt.

In the embodiment, of the plurality of divided photoreceptive portions of the PDt, the area of a photoreceptive portion close to the PDf is set to be smaller than the areas of the other photoreceptive portions. In other words, the photoreceptive portions F, G of the PDt which are close to the PDf have smaller areas of photoreceptive portions than the other photoreceptive portions C, D, E, H, and become shorter by 25 µm corresponding to 10% of 250 µm of a length in the longitudinal direction of the photoreceptive portions F, G, so that the photoreceptive portions F, G of the PDt are placed 25 µm farther away from the PDf than in the prior art.

By thus setting the areas of the photoreceptive portions F, G of the PDt to be small and placing far away from the PDf, light 41 diffracted in the HA+B domain of the hologram pattern 4 is prevented from entering the photoreceptive portion F or G of the PDt in the case of a small amount of scattering light which is made by a scratch in the tangent direction of the track of the optical disc and expanded in a direction parallel to the X axis, and the area of the light 41 diffracted in the HA+B domain entering into the photoreceptive portion F or G, that is, the amount of entering light is decreased even in the case of a large amount of scattering light, so that influences on a TES are reduced. Therefore, a TES does not become abnormally large, and it is possible to prevent a following track servo from deviating.

Figure 7A:
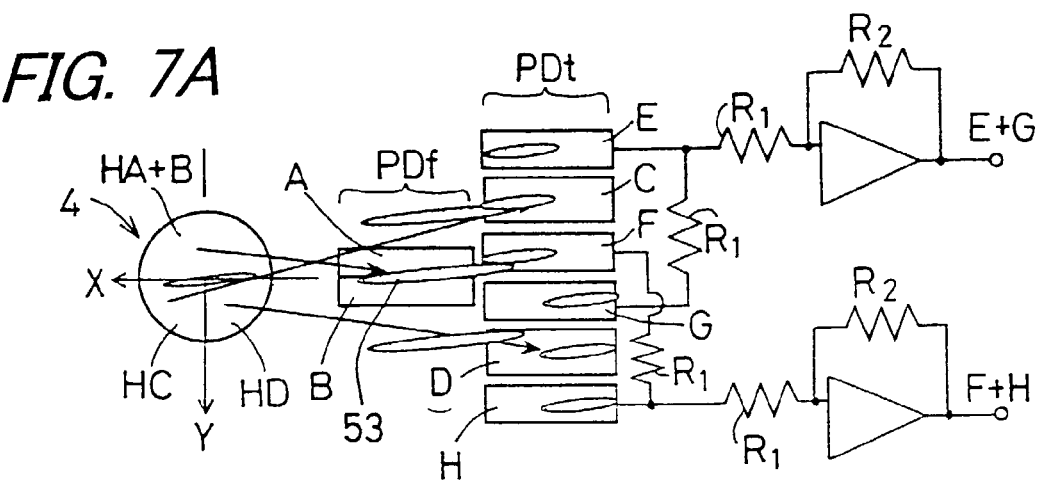
FIG. 7A is a view of a light-emitting device and an entering pattern of scattering light due to a scratch of an optical disc in a fourth embodiment of the invention and a view showing a configuration of an electric signal conversion circuit of a light signal.
Figure 7B:
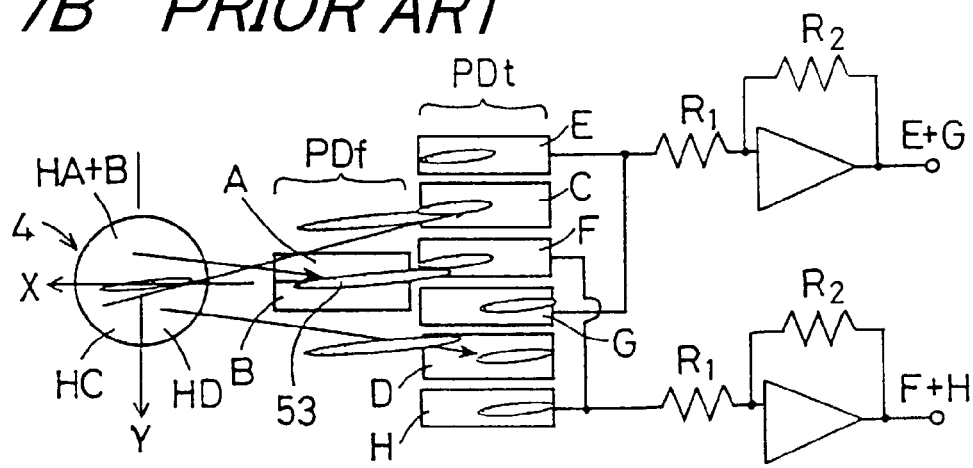
FIG. 7B is a view showing the prior art corresponding to the above.

FIG. 7A is a view of a light-emitting device and an entering pattern of scattering light due to a scratch of an optical disc in a fourth embodiment of the invention and a view showing a configuration of an electric signal conversion circuit of a light signal, and FIG. 7B is a view showing the prior art corresponding to the above. As shown in FIGS. 7A, 7B, the PDf and the PDt are independently formed as in the second embodiment, and other than a line of the PDt, the photoreceptive portions A, B of the PDf are placed so as to be adjacent to the photoreceptive portions F, G of the PDt.

Electric signals from the photoreceptive portions F, G of the PDt close to the PDf are added to an electric signal from the photoreceptive portion E or H of the PDt, respectively, and amplified by an operational amplifier, thereby becoming signal outputs of E+G and F+H. Further, according to the conventional electric signal conversion circuit view shown in FIG. 7B, electric signals from the photoreceptive portions E, G of the PDt or electric signals from the photoreceptive portions F, H of the PDt are added without weights. In the electric signal conversion circuit of the embodiment, as shown in FIG. 7A, electric signals from the photoreceptive portions F, G of the PDt are coupled to electric signals from the photoreceptive portions E, H via equivalent resistances $R_1$, respectively, and inputted to the operational amplifier via equivalent resistances $R_1$.

In contrast to that a signal output in the conventional circuit shown in FIG. 7B is $(E+G) \times R_2 \div R_1$, as shown in FIG. 7A, as a result of adding electric signals from the photoreceptive portions E, G and adding electric signals from F, H of the PDt via the resistances $R_1$, a signal output of the circuit becomes $E \times R_2 \div R_1 + G \times R_2 \div (R_1 + R_1)$ and a signal output from G becomes a half of that in the conventional electric circuit. That is to say, as a result of coupling electric signals from the photoreceptive portions F, G of the PDt to electric signals from the photoreceptive portions E, H via the equivalent resistances $R_1$, respectively, the ratio of an electric signal from the photoreceptive portion G becomes smaller than that of an electric signal from the photoreceptive portion E, and it is possible to lower sensitivity. In the invention, the ratio of an electric signal from the photoreceptive portion G becomes a half of the ratio of an electric signal from the photoreceptive portion E. Moreover, the same goes for the ratio of electric signals from the photoreceptive portions F, H, and the ratio of an electric signal from the photoreceptive portion F becomes a half of the ratio of an electric signal from the photoreceptive portion H.

By thus lowering the ratio of electric signals from the photoreceptive portions F, G, that is, light-receiving sensitivity, even in a case where scattering light which is made by a scratch in the tangent direction of the track of the optical disc and expanded in a direction parallel to the X axis reaches the photoreceptive domains, the strength of a signal obtained when light 53 diffracted in the HA+B domain of the hologram pattern 4 is converted as an output electric signal of the photoreceptive portion F or G of the PDt becomes a half of that in the prior art, and influences of the scattering light on a TES are reduced. Therefore, a TES does not become abnormally large, and it is possible to prevent a following track servo from deviating.

Figure 8:
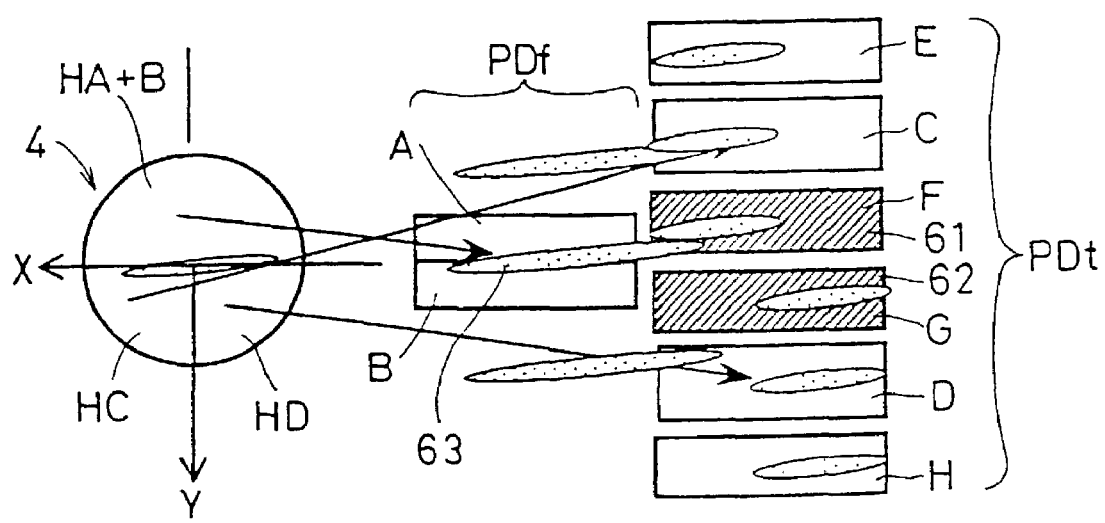
FIG. 8 is a view showing a light-emitting device and an entering pattern of scattering light due to a scratch of an optical disc in a fifth embodiment of the invention.

FIG. 8 is a view showing a light-emitting device and an entering pattern of scattering light due to a scratch of an optical disc in a fifth embodiment of the invention. As shown in FIG. 8, the PDf and the PDt are independently formed as in the second embodiment, and other than a line of the PDt, the photoreceptive portions A, B of the PDf are placed so as to be adjacent to the photoreceptive portions F, G of the PDt.

In the embodiment, on the photoreceptive portions F, G of the PDt which are close to the PDf, dielectric multilayer thin films 61, 62 whose surface reflectance is larger than that of the other photoreceptive portions C, D, E, H are formed.

Figure 9:
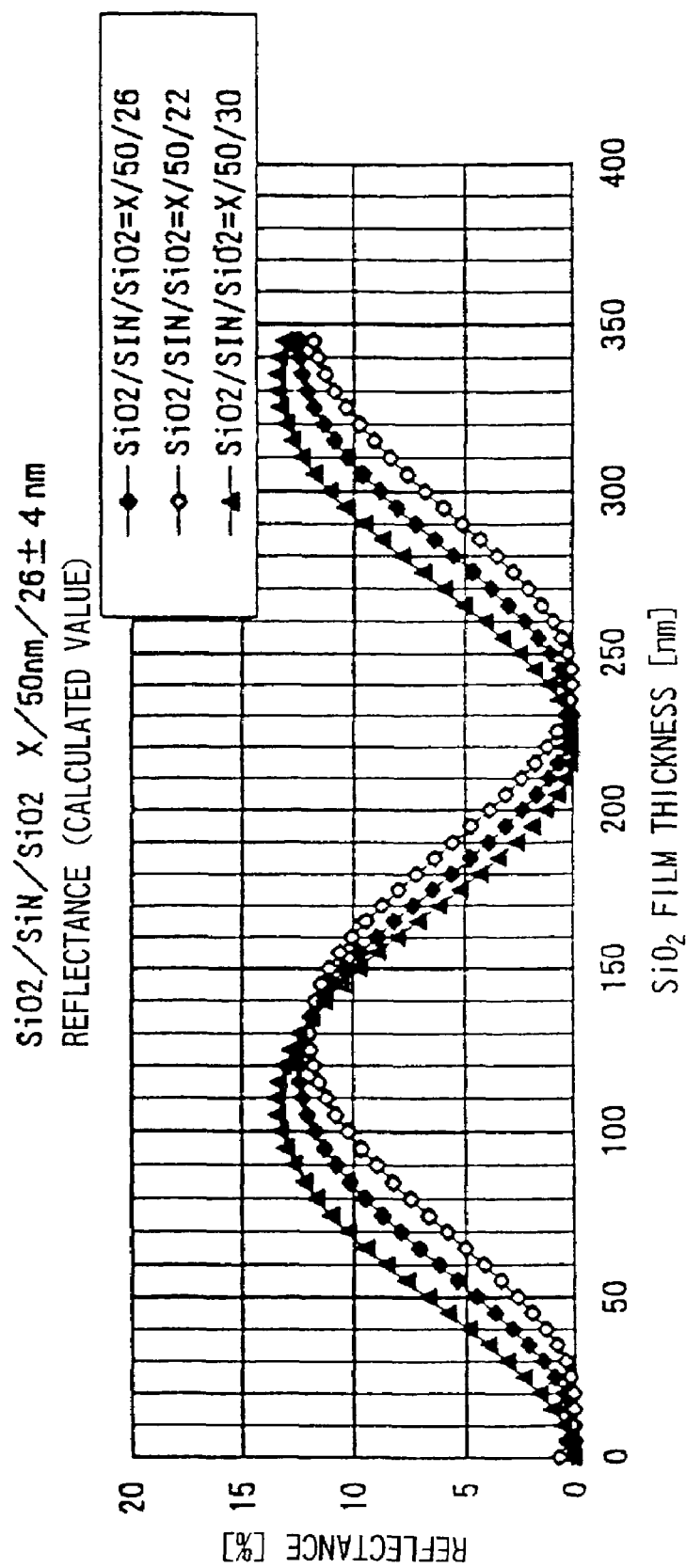
FIG. 9 is a graph showing a reflectance characteristic of a reflectance control dielectric thin film in the fifth embodiment of the invention.

The dielectric multilayer thin films 61, 62 have a composition of $SiO_2/SiN/SiO_2$. FIG. 9 is a graph showing a reflectance characteristic of a reflectance control dielectric thin film in the fifth embodiment. The lateral axis of the graph shows a film thickness of $SiO_2$, and the longitudinal axis shows reflectance. As shown in FIG. 9, such reflectance that is about 12% larger can be obtained by setting the film thickness of $SiO_2$ of a first layer of the dielectric multilayer thin films 61, 62 to be 120 nm, and a reflection free film can be obtained by setting the film thickness of $SiO_2$ to be 230 nm. Therefore, by forming first layers on the photoreceptive portions F, G of the PDt by the use of $SiO_2$ of 120 nm and forming first layers on the photoreceptive portions C, D, E, H be the use of $SiO_2$ of 230 nm, and laminating $SiN/SiO_2$ in which SiN is 50 nm and $SiO_2$ is 26 nm thereon, such a composition can be obtained that reflectance of the photoreceptive portions F, G is 12% larger than that of the photoreceptive portions C, D, E, H.

By thus setting surface reflectance of the photoreceptive portions F, G of the PDt close to the PDf to be lager than that of the other photoreceptive portions C, D, E, H of the PDt, even in a case where scattering light which is made by a scratch in the tangent direction of the track of the optical disc and expanded in a direction parallel to the X axis reaches the photoreceptive domains, the strength of a signal obtained when light 63 diffracted in the HA+B domain of the hologram pattern 4 is converted as an output electric signal becomes 12% smaller than that in the prior art, and influences of the scattering light on a TES are reduced. Therefore, a TES does not become abnormally large, and it is possible to prevent a following track servo from deviating.

In a sixth embodiment of the invention, the PDf and the PDt are independently formed as in the second embodiment, and other than a line of the PDt, the photoreceptive portions A, B of the PDf are placed so as to be adjacent to the photoreceptive portions F, G of the PDt.

Figure 10:
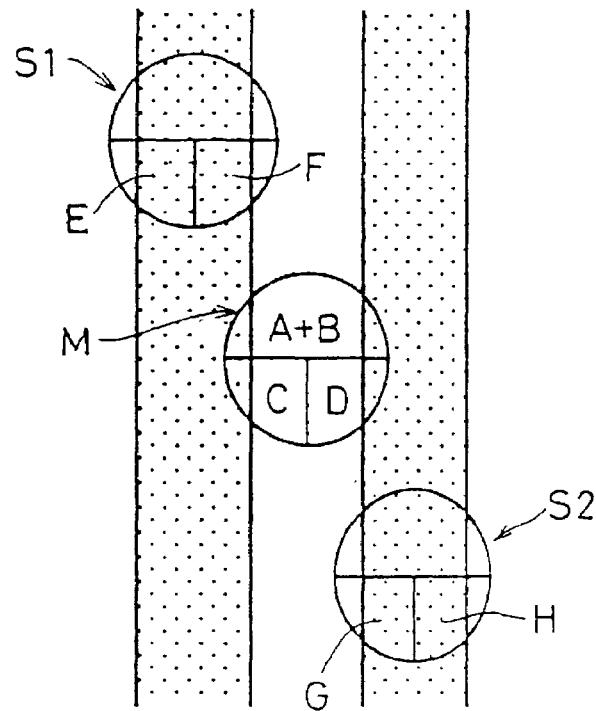
FIG. 10 is a view showing a state where a main beam and sub beams are collected on an optical disc in an optical pickup apparatus.

In the embodiment, as shown in the light path view in the optical pickup apparatus 22 of FIG. 3, light amounts at the spots 13a, 13b, 13c where the main beam and the sub beams divided into three directions by the grating 3 formed to the hologram device are collected on the optical disc 8 are set to have different ratios. FIG. 10 is a view showing a state where a main beam (M) and sub beams (S1, S2) are collected on an optical disc in an optical pickup apparatus. In respect to M, S1, S2 shown in FIG. 10, while S1:M:S2 is set to be 1:10:1 in the prior art, S1:M:S2 is set to be 1:6:1 in the embodiment to lower the light amount of zero-order diffraction light which is a main beam and decrease the ratio of the light amount of the main beam with respect to the sub beams, whereby the ratios of first-order diffraction light and minus-first-order diffraction light which are the sub beams are relatively increased.

Figure 11:
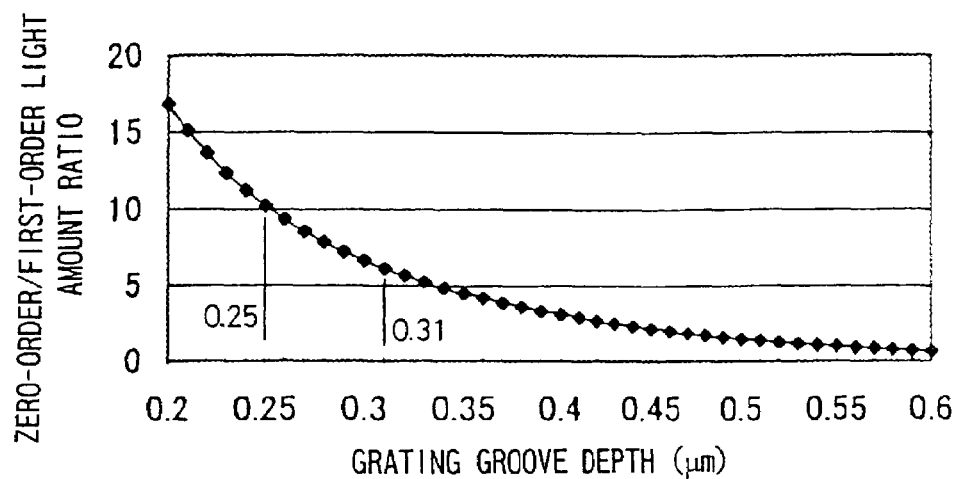
FIG. 11 is a graph showing a relation between a depth of a grating groove and a spectral ratio (a ratio of light amounts) in a sixth embodiment of the invention.

FIG. 11 is a graph showing a relation between a depth of a grating groove and a spectral ratio (a ratio of light amounts) in the sixth embodiment of the invention. The lateral axis of the graph shows the depth of a grating groove, and the longitudinal axis shows the light amount ratio between zero-order diffraction light and first-order diffraction light/minus-first-order diffraction light. The light amount ratio between zero-order diffraction light which is the main beam and first-order diffraction light/minus-first-order diffraction light which are the sub beams divided by the grating 3, as shown in FIG. 11, can be controlled by the depth of a grating groove. In contrast to 0.25 μm of the depth of a groove in the prior art, the groove is deepened to be 0.31 μm in the embodiment, whereby a light amount ratio is lowered. The depth of a groove can be controlled by an etching time, and the embodiment is achieved by elongating an etching time by about 20%.

By thus decreasing the ratio of the light amount of zero-order diffraction light which is the main beam to those of first-order diffraction light/minus-first-order diffraction light which are the sub beams, even in a case where scattering light which is made by a scratch in the tangent direction of the track of the optical disc and expanded in a direction parallel to the X axis reaches the photoreceptive domains, the amount of light obtained when reflection light of zero-order diffraction light which is the main beam is diffracted in the HA+B domain of the hologram pattern 4 is decreased, whereas the amount of light obtained when reflection light of first-order diffraction light/minus-first-order diffraction light which are the sub beams is diffracted in the HC and HD domains of the hologram patter 4 is increased. Therefore, influences on an output electric signal of the photoreceptive portion F or G of the PDt become relatively small, and influences of the scattering light on a TES are reduced. Therefore, a TES does not become abnormally large, and it is possible to prevent a following track servo from deviating.

Figure 12A:
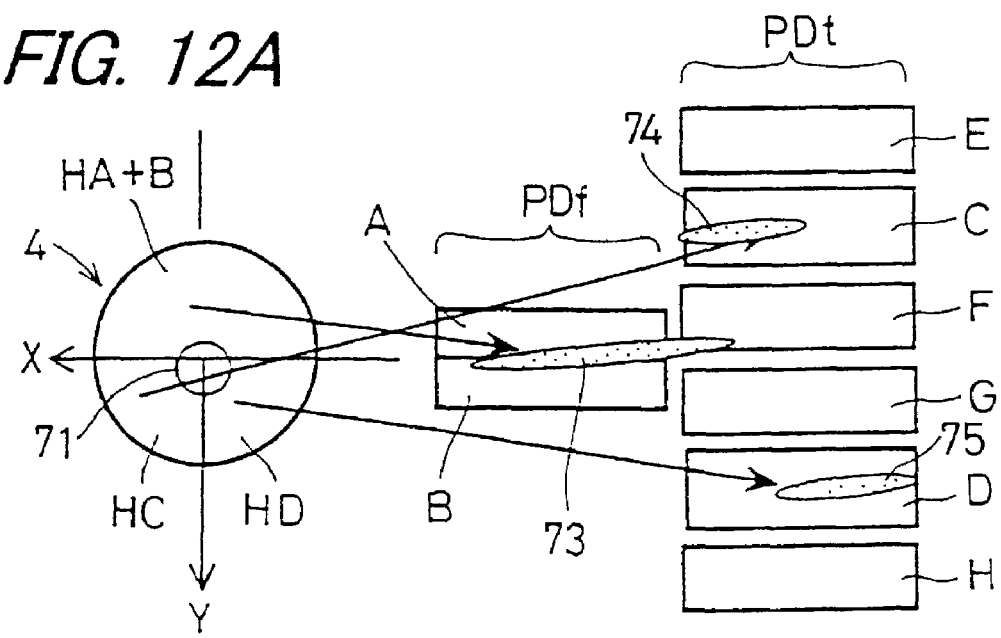
FIG. 12A is a view showing a relation between a hologram pattern and reflection light of zero-order diffraction light in a seventh embodiment of the invention.
Figure 12B:
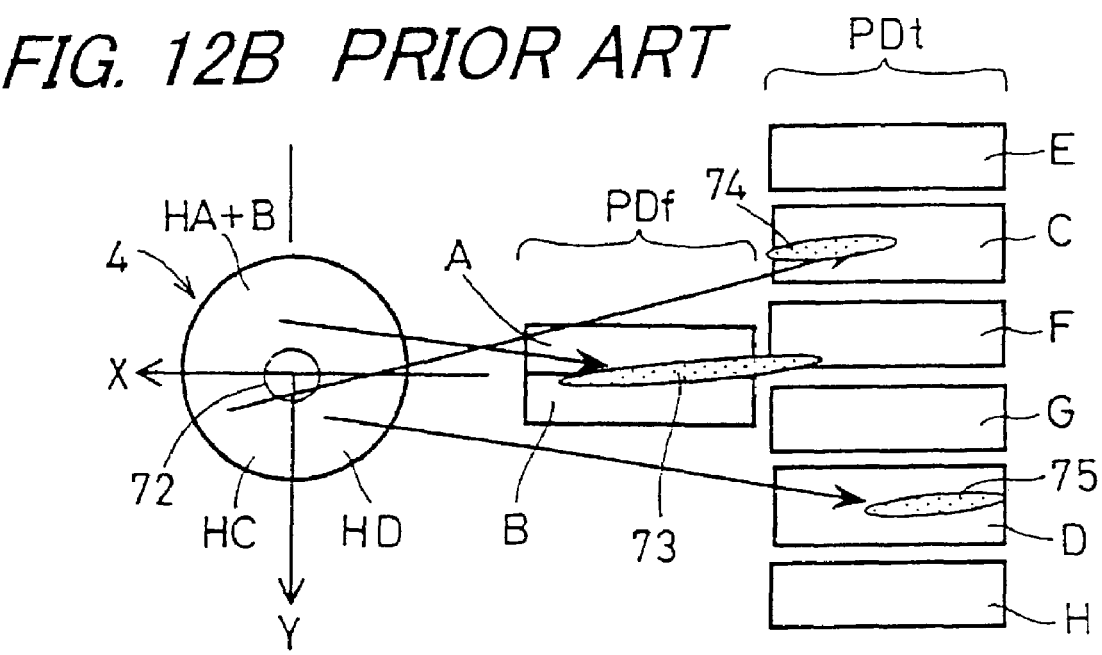
FIG. 12B is a view showing the prior art corresponding to the above.

FIG. 12A is a view showing a relation between the hologram pattern 4 and reflection light of zero-order diffraction light in a seventh embodiment, and FIG. 12B is a view showing the prior art corresponding to the above. As shown in FIG. 12A, in the seventh embodiment, the PDf and the PDt are independently formed as in the second embodiment, and other than a line of the PDt, the photoreceptive portions A, B of the PDf are placed so as to be adjacent to the photoreceptive portions F, G of the PDt.

Reflection light of zero-order diffraction light 13a is diffracted in three directions depending on which domain among the HA+B, HC and HD of the hologram pattern 4 the reflection light enters, thereby entering a photoreceptive portion A+B of the PDf, that is, both the photoreceptive portion A and the photoreceptive portion B, the photoreceptive portions C, and D of the PDt, respectively.

Here, the ratio of light amounts at the spots 13a, 13b, 13c where the main beam M and the sub beams S1, S2 divided in three directions by the grating 3 formed in the hologram device 2 are collected on the optical disc is S1:M:S2=1:10:1.

As shown in FIG. 12B, in the prior art, when the area that reflection light 72 of the zero-order diffraction light 13a enters the HA+B domain of the hologram pattern 4 and the area that the reflection light enters the HC domain and the HD domain are set to become equal, that is, an intersection point of three division of the hologram pattern 4 and the center of the reflection light of the zero-order diffraction light which is the main beam are set to match with each other, and output signals from the photoreceptive domains in the hologram pattern 4 are denoted by VA, VB, VC, VD, respectively, the position in the Y axis direction of the hologram device is adjusted so as to satisfy VA+VB=VC+VD. In the embodiment, as shown in FIG. 12A, the position of the hologram device is shifted in the negative direction of the Y axis, whereby adjustment is performed so that the area that reflection light 71 of the zero-order diffraction light 13a enters the hologram pattern 4 becomes HA+B<HC+HD, that is, VA+VB<VC+VD is satisfied.

Specifically, while the position of the hologram device is adjusted so as to satisfy (VA+VB)/(VC+VD)≈1.0 in the prior art, the position is adjusted so as to satisfy (VA+VB)/(VC+VD)≈0.8 in the invention.

As a result of thus setting a relation between the area that the reflection light of the zero-order diffraction light 13a enters the HA+B domain of the hologram pattern 4 and the area that the light enters the HC and HD domains to satisfy HA+B<HC+HD, even in a case where scattering light which is made by a scratch in the tangent direction of the track of the optical disc and expanded in a direction parallel to the X axis reaches the photoreceptive domains, the light amount of light 73 made when the reflection light of the zero-order diffraction light is diffracted in the HA+B domain of the hologram pattern 4 decreases, whereas the light amount of light 74, 75 made when the reflection light is diffracted in the HC and HD domains increases. Therefore, influences on an output electric signal of the photoreceptive portion F or G of the PDt become relatively small, and influences of the scattering light on a TES are reduced. Therefore, a TES does not become abnormally large, and it is possible to prevent a following track servo from deviating.

Figure 13A:
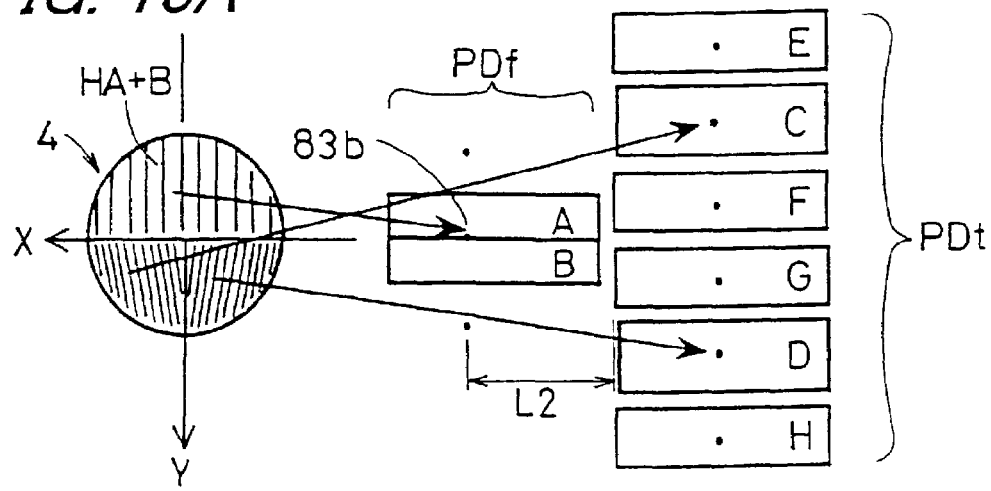
FIG. 13A is a view showing a position of a collection point on a photoreceptive domain for focusing error signal in an eighth embodiment of the invention.
Figure 13B:
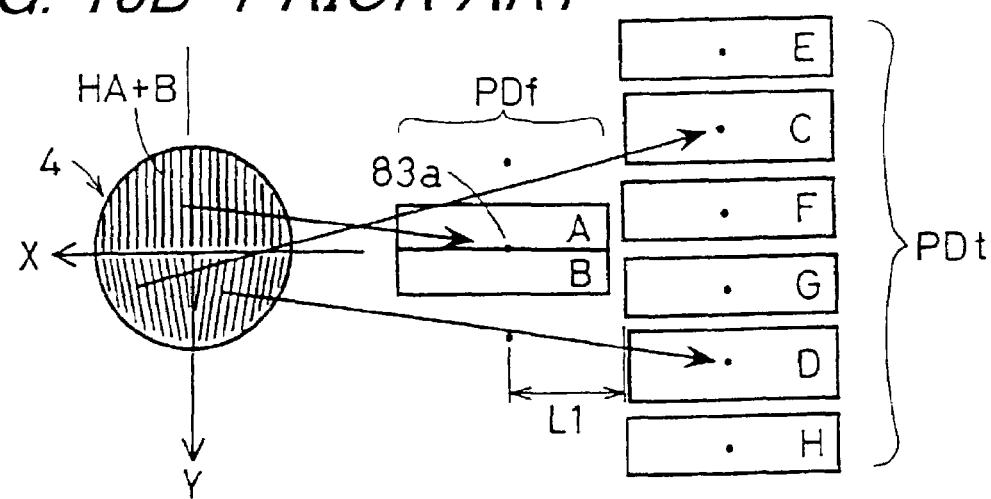
FIG. 13B is a view showing the prior art corresponding to the above.
Figure 14:
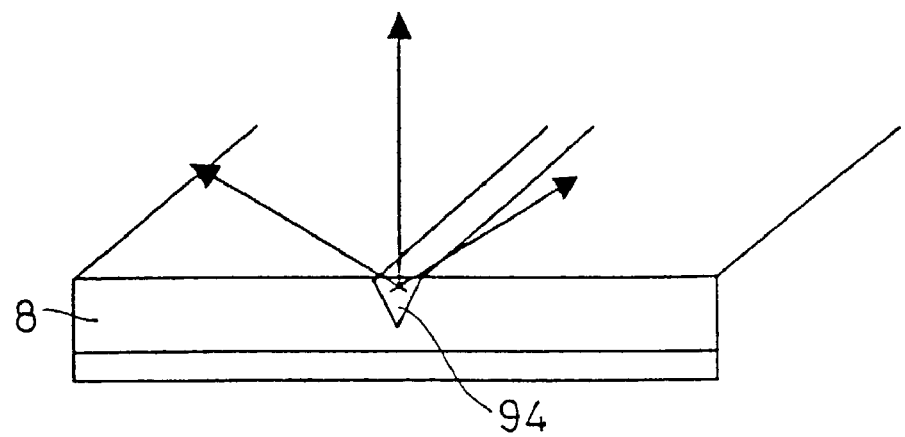
FIG. 14 is a view showing a condition where scattering light is caused in a direction orthogonal to a scratch on a surface of an optical disc.
Figure 15:
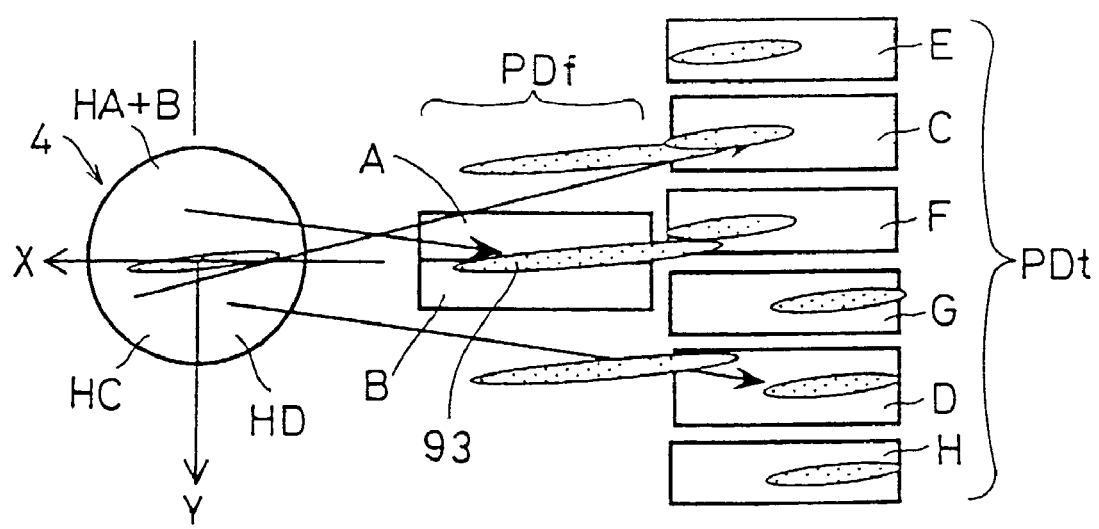
FIG. 15 is a view showing a light-emitting device and an entering pattern of scattering light due to a scratch of an optical disc in the prior art.

FIG. 13A is a view showing the position of a collection point on the photoreceptive domain for focusing error signal in an eighth embodiment, and FIG. 13B is a view showing a prior art corresponding to the above. As shown in FIG. 13A, in the eighth embodiment, the PDf and the PDt are independently formed as in the second embodiment, and other than a line of the PDt, the photoreceptive portions A, B of the PDf are placed so as to be adjacent to the photoreceptive portions F, G of the PDt.

In the prior art, as shown in FIG. 13B, a position where light made when reflection light of the zero-order diffraction light 13a is diffracted in the HA+B domain of the hologram pattern 4 is collected is set to be the center of the photoreceptive portions A, B of the PDf. In the embodiment, as shown in FIG. 13A, a position where reflection light of the zero-order diffraction light 13a is collected after diffracted in the HA+B domain of the hologram pattern 4 is not set to be the center of the photoreceptive portions A and B of the PDf, but the position of a collection point is shifted from 83a to 83b so as to be away from the PDt by a distance L2. The position of the collection point 83b is changed by widening a diffraction grating pitch of the hologram pattern 4 and lowering a diffraction angle. In the embodiment, by widening a pitch of the HA+B domain of the hologram pattern 4, the position of the collection point 83b shown in FIG. 13A is shifted 25 µm in the positive direction of the X axis from the center of the photoreceptive domain HA+B. That is to say, the position is separated by the distance L2 which is 25 µm more than a distance L1 from an edge of the PDt close to the PDf to the collection point 83a. The shift amount of the collection point position is set to be an amount corresponding to 10% of 250 µm which is a length in a longitudinal direction of the photoreceptive portion A of the PDf.

As described above, the position of the point 83b where reflection light of the zero-order diffraction light 13a is collected to the PDf is placed so as to be far away from the PDt, whereby light diffracted in the HA+B domain of the hologram pattern 4 does not enter into the photosensitive portion F or G of the PDt in cases where scattering light which is made by a scratch in the tangent direction of the track of the optical disc and expanded in a direction parallel to the X axis is a little, and the area that light diffracted in the HA+B domain enters, that is, the amount of entering light is decreased even in cases where the scattering light is a lot, so that influences of the scattering light on a TES are reduced. Therefore, a TES does not become abnormally large, and it is possible to prevent a following track servo from deviating.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pickup apparatus comprising:
a light-emitting device having a photoreceptive domain for focusing error signal and a photoreceptive domain for trucking error signal formed independently, the optical pickup apparatus outputting a focusing error signal necessary for a focus servo process in response to light received in the photoreceptive domain for focusing error signal, and outputting a tracking error signal necessary for a track servo process in response to light received in the photoreceptive domain for tracking error signal,
the optical pickup apparatus being constituted so as to reduce influences of scattering of light entering the photoreceptive domain for focusing error signal, on the tracking error signal,
wherein the photoreceptive domain for tracking error signal is divided into a plurality of photoreceptive portions; and
the plurality of photoreceptive domains for tracking error signal and photoreceptive domain for focusing error signal are aligned in one line.

2. An optical pickup apparatus comprising:
a light-emitting device having a photoreceptive domain for focusing error signal and a photoreceptive domain for tracking error signal formed independently, the optical pickup apparatus outputting a focusing error signal necessary for a focus servo process in response to light received in the photoreceptive domain for focusing error signal, and outputting a tracking error signal necessary for a track servo process in response to light received in the photoreceptive domain for tracking error signal,
the optical pickup apparatus being constituted so as to reduce influences of scattering of light entering the photoreceptive domain for focusing error signal, on the tracking error signal,
wherein the photoreceptive domain for tracking error signal is divided into a plurality of photoreceptive portions; and
of the divided photoreceptive portions, on an entire face of a photoreceptive portion close to the photoreceptive domain for focusing error signal or on part of a side close to the photoreceptive domain for focusing error signal, lightproof means is mounted.

3. An optical pickup apparatus comprising:
a light-emitting device having a photoreceptive domain for focusing error signal and a photoreceptive domain for tracking error signal formed independently, the optical pickup apparatus outputting a focusing error signal necessary for a focus servo process in response to light received in the photoreceptive domain for error signal, and outputting a tracking error signal necessary for a track servo process in response to light received in the photoreceptive domain for tracking error signal,
the optical pickup apparatus being constituted so as to reduce influences of scattering of light entering the photoreceptive domain for focusing error signal, on the tracking error signal,
wherein the photoreceptive domain for tracking error signal is divided into a plurality of photoreceptive potions; and
of the divided photoreceptive portions, an area of a photoreceptive portion close to the photoreceptive domain for focusing error signal is smaller than areas of the other photoreceptive portions.

4. An optical pickup apparatus comprising:
a light-emitting device having a photoreceptive domain for focusing error signal and a photoreceptive domain for tracking error signal formed independently, the optical pickup apparatus outputting a focusing error signal necessary for a focus servo process in response to light received in the photoreceptive domain for focusing error signal, and outputting a tracking error signal necessary for a track servo process in response to light received in the photoreceptive domain for tracking error signal,
the optical pickup apparatus being constituted so as to reduce influences of scattering of light entering the photoreceptive domain for focusing error signal, on the tracking error signal,
wherein the photoreceptive domain for tracking error signal is divided into a plurality of photoreceptive potions; and
of the divided photoreceptive portions, a photoreceptive portion close to the photoreceptive domain for focusing error signal has smaller sensitivity than the other divided photoreceptive portions.

5. An optical pickup apparatus comprising:
a light-emitting device having a photoreceptive domain for focusing error signal and a photoreceptive domain for tracking error signal formed independently, the optical pickup apparatus outputting a focusing error signal necessary for a focus servo process in response to light received in the photoreceptive domain for focusing error signal, and outputting a tracking error signal necessary for a track servo process in response to light received in the photoreceptive domain for tracking error signal,
the optical pickup apparatus being constituted so as to reduce influences of scattering of light entering the photoreceptive domain for focusing error signal, on the tracking error signal,
wherein the photoreceptive domain for tracking error signal is divided into a plurality of photoreceptive potions; and
of the divided photoreceptive portions, a photoreceptive portion close to the photoreceptive domain for focusing error signal has larger surface reflectance than the other divided photoreceptive portions.

6. An optical pickup apparatus comprising:
a light-emitting device having a photoreceptive domain for focusing error signal and a photoreceptive domain for tracking error signal formed independently, the optical pickup apparatus outputting a focusing error signal necessary for a focus servo process in response to light received in the photoreceptive domain for focusing error signal, and outputting a tracking error signal necessary for a track servo process in response to light received in the photoreceptive domain for tracking error signal,
the optical pickup apparatus being constituted so as to reduce influences of scattering of light entering the photoreceptive domain for focusing error signal, on the tracking error signal,
wherein the photoreceptive domain for tracking error signal is divided into a plurality of photoreceptive potions;
light entering a light-emitting device is divided into one main beam and two sub beams; and
the main beam enters the photoreceptive domain for focusing error signal and a ratio of a light amount of the main beam to those of the sub beams is lowered, whereby a light amount of scattering light of the main beam entering a photoreceptive portion of the photoreceptive domain for tracking error signal close to the photoreceptive domain for focusing error signal is reduced.

7. An optical pickup apparatus comprising:
a light-emitting device having a photoreceptive domain for focusing error signal and a photoreceptive domain for tracking error signal formed independently, the optical pickup apparatus outputting a focusing error signal necessary for a focus servo process in response to light received in the photoreceptive domain for error signal, and outputting a tracking error signal necessary for a track servo process in response to light received in the photoreceptive domain for tracking error signal,
the optical pickup apparatus being constituted so as to reduce influences of scattering of light entering the photoreceptive domain for focusing error signal, on the tracking error signal,
wherein an amount of light entering the photoreceptive domain for focusing error signal is set to be smaller than an amount of light which enters the photoreceptive domain for tracking error signal.

8. An optical pickup apparatus comprising:
a light-emitting device having a photoreceptive domain for focusing error signal and a photoreceptive domain for tracking error signal formed independently, the optical pickup apparatus outputting a focusing error signal necessary for a focus servo process in response to light received in the photoreceptive domain for focusing error signal, and outputting a tracking error signal necessary for a track servo process in response to light received in the photoreceptive domain for tracking error signal,
the optical pickup apparatus being constituted so as to reduce influences of scattering of light entering the photoreceptive domain for focusing error signal, on the tracking error signal,
wherein an entering position into the photoreceptive domain for focusing error signal is separated from the photoreceptive domain for tracking error signal so that scattering of light which enters the photoreceptive domain for focusing error signal does not enter the photoreceptive domain for tracking error signal.

9. An optical pickup apparatus according to claims 1, 2, 4, 6, 7 or 8 comprising:
   a light source;
   a stem on which the light source and light-emitting device are mounted;
   a cap fixed to the stem, for sealing the light-emitting device; and
   a hologram device fixed to the cap.

* * * * *